March 12, 1963 C. H. WICKENBERG 3,081,395
HANDLE AND COVER MEANS FOR COOKING VESSELS
Filed July 10, 1961 3 Sheets-Sheet 1

INVENTOR:
Chester H. Wickenberg
BY
George R. Clark
Atty

March 12, 1963 C. H. WICKENBERG 3,081,395
HANDLE AND COVER MEANS FOR COOKING VESSELS
Filed July 10, 1961 3 Sheets-Sheet 3

INVENTOR.
Chester H. Wickenberg
BY
George R. Clark
Atty

United States Patent Office 3,081,395
Patented Mar. 12, 1963

3,081,395
HANDLE AND COVER MEANS FOR COOKING VESSELS
Chester H. Wickenberg, Elgin, Ill., assignor to Sunbeam Corporation, Chicago, Ill., a corporation of Illinois
Filed July 10, 1961, Ser. No. 122,812
12 Claims. (Cl. 219—44)

This invention relates to an improved handle and cover means for cooking vessels, and more particularly, to improved handle means for cooking vessels and their covers which can be utilized to support the covers on the vessels in tilted position.

The invention will be described in connection with a well known form of immersible electrical frypan which has sealed electrical heating means and removable control means so that the frypan can be fully immersed in a cleaning fluid. However, the novel features of the invention are not restricted to this particular form of cooking vessel.

In the process of preparing foods in a frypan the housewife may find it necessary to remove the cover and temporarily set it aside. Conventionally the cover is inverted so that juices, vapors or the like accumulated on the inside of the cover will not soil the surface on which it is placed. When the housewife wishes to replace the cover, it may still be too hot to grasp along its rim, and it cannot be grasped by its conventional top handle without danger of burning herself since the cover is then in an inverted position. Therefore, it would be desirable to provide the cover with an auxiliary handle to facilitate return of the cover to the frypan from its removed inverted position.

Frypans conventionally have elongated handles projecting from one of their sides for handling the frypan. However, electrical frypans have become quite large and when they are full with food these handles alone may not be sufficient to enable the housewife to easily lift the frypan and its contents. Therefore, it would be desirable to also provide the frypan vessel with an auxiliary handle.

While the food is being prepared in the frypan the housewife may wish to merely partially open the cover, and leave it partially open or work on the food and then reclose the partially opened cover. It would be desirable to provide means to facilitate this without making it necessary for the housewife to manually hold the cover partially open so that she has both hands free to work on the food in the frypan or do other kitchen chores.

Accordingly, it is one object of this invention to provide an improved cooking vessel which will have the above-mentioned advantageous characteristics.

It is a further object of the invention to provide improved auxiliary handle means for frypan vessels and their covers.

It is a further object of the invention to provide an improved cover tilt means for covered cooking vessels.

It is a further object of the invention to provide improved auxiliary handle means for frypan vessels and their covers which can be utilized as means for supporting the covers in partially opened tilted position with respect to the frypan vessels.

A further object of the invention is to provide the above-mentioned desirable characteristics in cooking vessels in a low cost and uncomplicated manner which utilizes a minimum number of parts and which is readily assembled and quick to operate.

A still further object of the invention is to provide the above-mentioned advantages in conventional cooking vessels without requiring any major changes or modifications in their basic structural parts.

In the preferred form of the invention, covered cooking vessels are provided with improved means having the dual purpose of auxiliary handle means for the vessel and its cover and tiltably supporting the cover with respect to the vessel. More specifically, in the illustrated form of the invention a frypan vessel is provided wtih a U-shaped insulating material handle opposite to its main handle and the cover is provided with an insulating material projection adjacent to its rim which serves as an auxiliary cover handle. These auxiliary handles are utilized as means for tilting the cover with respect to the frypan vessel by inserting the auxiliary cover handle into the auxiliary frypan handle. Furthermore, the arrangement is such that the cover can be tilted with respect to the frypan vessel by mere rocking movement of the cover about its rim as contrasted to a plurality of movements in different directions such as first a straight lifting movement of the cover and then an inserting tilted motion of the auxiliary cover handle into the auxiliary vessel handle. Also, this is accomplished without any fixed connection between the cover and frypan or their auxiliary handles so that the cover can be readily reclosed or entirely removed from its tilted position. Additionally, in the invention preferably the auxiliary handles are provided with means for supporting the cover in a plurality of different tilted positions, such as at angles of about 30, 45, 60, and 75 degrees, and also in a full open position.

In the invention the above features are provided in an uncomplicated and low cost manner which is easy to operate and assemble, and which requires a minimum number of parts necessitating no major changes or modifications in the basic structural parts of conventional cooking vessels. For instance, the two auxiliary handles may comprise readily fabricated plastic parts having integrally formed stepped or shouldered portions thereon which are selectively engageable with each other to provide the various tilted positions. Also, in all tilted positions, the cover is preferably disposed over the frypan so that juices, vapors or the like collected on the cover will drip back into the frypan.

The features of the invention which are believed to be novel are set forth with particularity in the appended claims. The invention itself, however, both as to its organization and operation, together with further objects and advantages thereof, may best be understood by reference to the following description taken in connection with the accompanying drawings.

In the drawings, FIG. 1 is a perspective view of one form of the invention;

Figure 1:
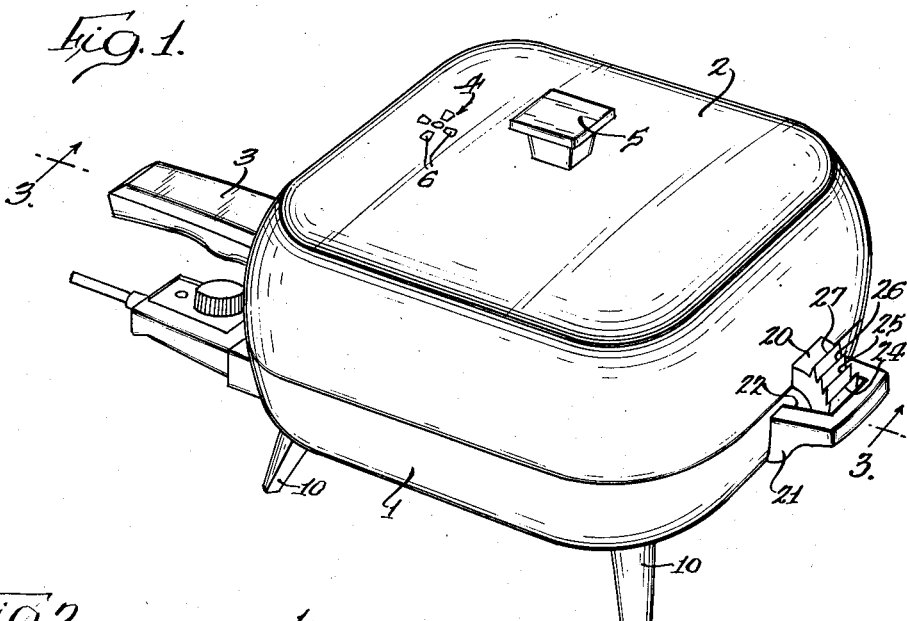
Figure 2:
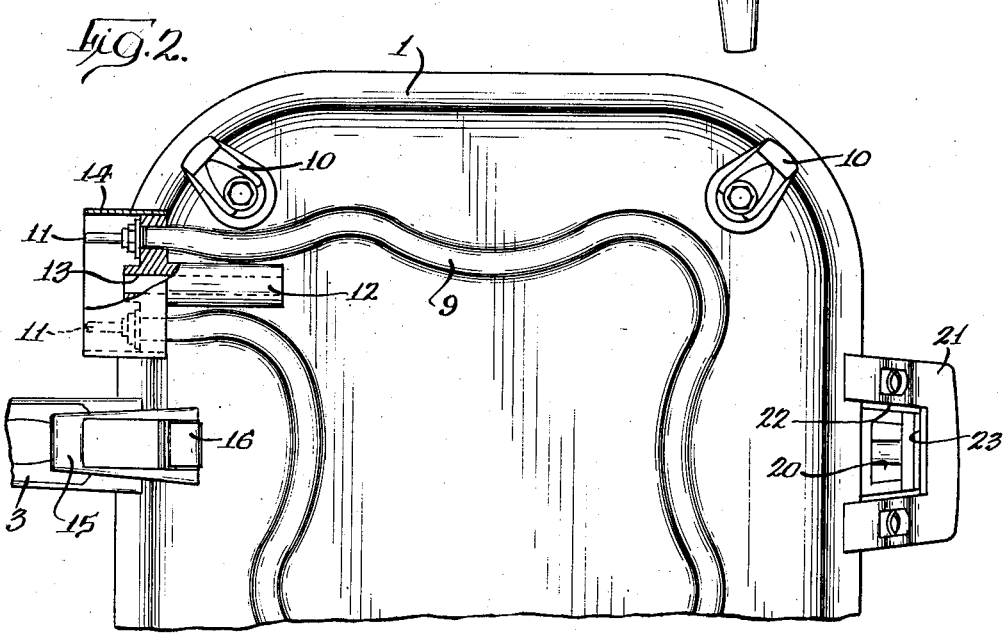
FIG. 2 is a broken away enlarged bottom view of the frypan shown in FIG. 1.

The form of the invention illustrated in the drawings comprises a frypan having a shallow vessel 1, a cover 2 for closing vessel 1, and a main handle 3 connected to the vessel 1. The vessel 1 is illustrated as having a generally square configuration with rounded corners but obviously the vessel could have other shapes. The handle 3 is connected to one of the sides of the vessel and centrally thereof. Handle 3 is an elongated electrical insulating material member and projects laterally away from the vessel as is conventional in the art.

The cover 2 may have conventional vent means 4 formed thereon and also a centrally disposed main insulating material handle 5. Preferably the top of handle 5 is flat so that when cover 2 is placed in inverted position on a supporting surface the cover will be horizontally disposed. The vent means 4 may comprise apertures 6 which can be opened and closed by an adjustably movable apertured member 7 which is rotatably mounted on the cover 2 over apertures 6. Preferably the rim of cover 2 has a stepped flange 8 formed therealong which is received in the vessel 1 to seat the cover thereon so that it will not slide off the vessel.

Although the invention is useful in conventional frypans which are heated on the cooking surfaces of cooking ranges or the like, the illustrated form of the invention comprises a frypan having a built-in or embedded electrical heating element. The electrical heating element is indicated by reference numeral 9 and it is formed on the underside of the vessel 1 by molding or casting it with the vessel or by brazing the same on the vessel. In order to protect support surfaces from being scorched or damaged by the heating element 9, the vessel 1 is supported on a plurality of insulating feet or the like 10. Support feet 10 are disposed adjacent the corners of the vessel.

The electrical frypan preferably is fully immersible in a cleaning liquid for washing and the like. That is to say, the terminal ends of heating element 9 adjacent to handle 3 are sealed closed and are provided with liquid tight terminals 11. The fully immersible electrical frypan is preferably controlled by a removable probe type control shown on the left side of the frypan in FIG. 1. To facilitate this the terminal ends of the heating element 9 and their terminals 11 are supported by a somewhat T-shaped member 12 having a thermal probe receiving opening or chamber 13 formed therein. The chamber 13 is adapted to receive the temperature sensing probe of the removable control, and the terminals 11 are simultaneously received in socket type electrical connectors of the removable control.

The terminals 11 are protected by a guard member 14 which is mounted on the member 12 and surrounds the terminals 11 in spaced relationship. The removable probe type control is adapted to be inserted into the guard 14. Although the terminal ends of the heater 9 are illustrated as being located on the side of the vessel adjacent to main handle 3, it will be obvious to those skilled in the art that the terminal ends of the heater 9 could be located on other sides of the vessel.

The frypan structure so far described is conventional and is present in electrical cooking vessels currently available on the commercial market. Additionally, the sealed electrical heating element and its terminals and the details of the removable probe type control means are more particularly described in copending patent application Serial No. 739,876 filed by Ivar Jepson and Chester H. Wickenberg on June 4, 1958, for a Cooking Vessel and assigned to the same assignee as the instant application. These additional details are not required for a full understanding of the instant invention and, therefore, are not being incorporated herein. Additionally, although the preferred form of the invention is illustrated in connection with an electric frypan having a removable control, it will be obvious to those skilled in the art that the instant invention is also useful in electric frypans having non-removable control means. An example of such an electric frypan is Jepson Patent 2,744,995 for Electric Frypan issued May 8, 1956, and assigned to the same assignee as the instant invention.

There may be times when the housewife may wish to tilt the frypan vessel with respect to the supporting surface. Such a tilted position of the frypan vessel is useful in preparing foods such as bacon to permit the grease to run off the food to one side of the vessel. The means for accomplishing this may comprise a collapsible fifth supporting leg 15 which is supported adjacent to the main handle 3 by means such as a spring element 16 which is connected to the vessel by bolting it between the rim of the vessel and the handle 3. The spring element 16 cooperates with the leg 15 to impart snap action movement thereto between a vertically disposed position and a horizontally disposed position. The leg 15 extends below the legs 10 in its vertically disposed position. Accordingly, when leg 15 is vertically disposed, the frypan is supported in tilted position on the leg 15 and the two legs 10 located on the side of the frypan opposite to the handle 3. This feature of the illustrated frypan is more particularly disclosed and claimed in copending patent application Serial No. 15,323 filed on March 16, 1960, by Chester H. Wickenberg for Cooking Vessel Improvement and assigned to the same assignee as the instant invention.

Assuming that in the process of preparing food in the frypan a housewife has removed the cover 2 and positioned it in an inverted position on a support surface, when she desires to replace the cover 2 if she tries to grasp it by the handle 5 she may burn herself if the cover 2 is still hot. Accordingly, an insulating material member 20 is connected to the cover 2 adjacent the rim portion thereof which serves as an auxiliary handle for the cover 2 to facilitate return of the same to the frypan from its inverted position. The auxiliary handle 20 has additional features which will be described hereinafter.

The main vessel handle 3 provides means for manually holding the frypan from a single location. When the vessel is filled with food, it is quite heavy and handle 3 as a sole support means becomes inadequate and tiring on the user of the frypan. Accordingly, an auxiliary handle 21 constructed from insulating material is provided on the side of the frypan opposite from handle 3. In this manner, the frypan can be easily and conveniently manually supported.

For the purpose of supporting the cover 2 on the vessel 1 in tilted relationship an aperture 22 is provided in the auxiliary handle 21 which is adapted to receive the auxiliary handle 20 therein. The arrangement could be the reverse from that illustrated. That is to say, the opening 22 could be provided in the auxiliary handle on the cover with the auxiliary handle of the vessel being received therein. The opening 22 is provided by making the auxiliary handle 21 U-shaped.

For the purpose of supporting the cover 2 on the vessel 1 in a plurality of different tilted positions, cooperative stepped or shouldered portions 23 are formed on the bight or bridge portion of the handle 21 and 24, 25, 26 and 27 are formed on the auxiliary handle 20. A series of four stepped or shouldered portions 24 to 27 are provided on the auxiliary handle 20 to provide four tilted positions. However, the number of stepped or shouldered portions could be more or less depending upon the number of different tilted positions required. Additionally, the parts could be reversed so that the series of stepped portions 24 to 27 are provided on the auxiliary handle 21 and the single cooperative stepped or shouldered portion 23 is provided on the auxiliary handle 20.

Figure 6:
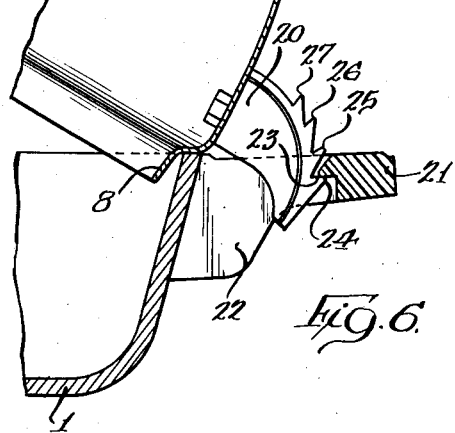
FIG. 6 is a view similar to FIG. 5 but with the cover partially open.

In order to tilt the cover, it is grasped by the handle 5 and merely rocked or pivoted towards the auxiliary handle 21 about the cover rim 8 along the upper edge of the vessel 1 to move member 20 into the opening 22 in handle 21. When the first step 24 is engaged with the step 23, the cover will be disposed at an angle of about 30 degrees with respect to the vessel. The angular relationship for the step portions 25, 26 and 27 will be about 45, 60, and 75 degrees, respectively. In each of these dispositions of the cover with respect to the vessel, the flange 8 will still be disposed inside of the rim of the vessel 1 as clearly illustrated in FIG. 6. This is so that any juices, vapors or the like which have collected on the inner surface of the cover 2 will run back into the vessel 1.

Figure 3:
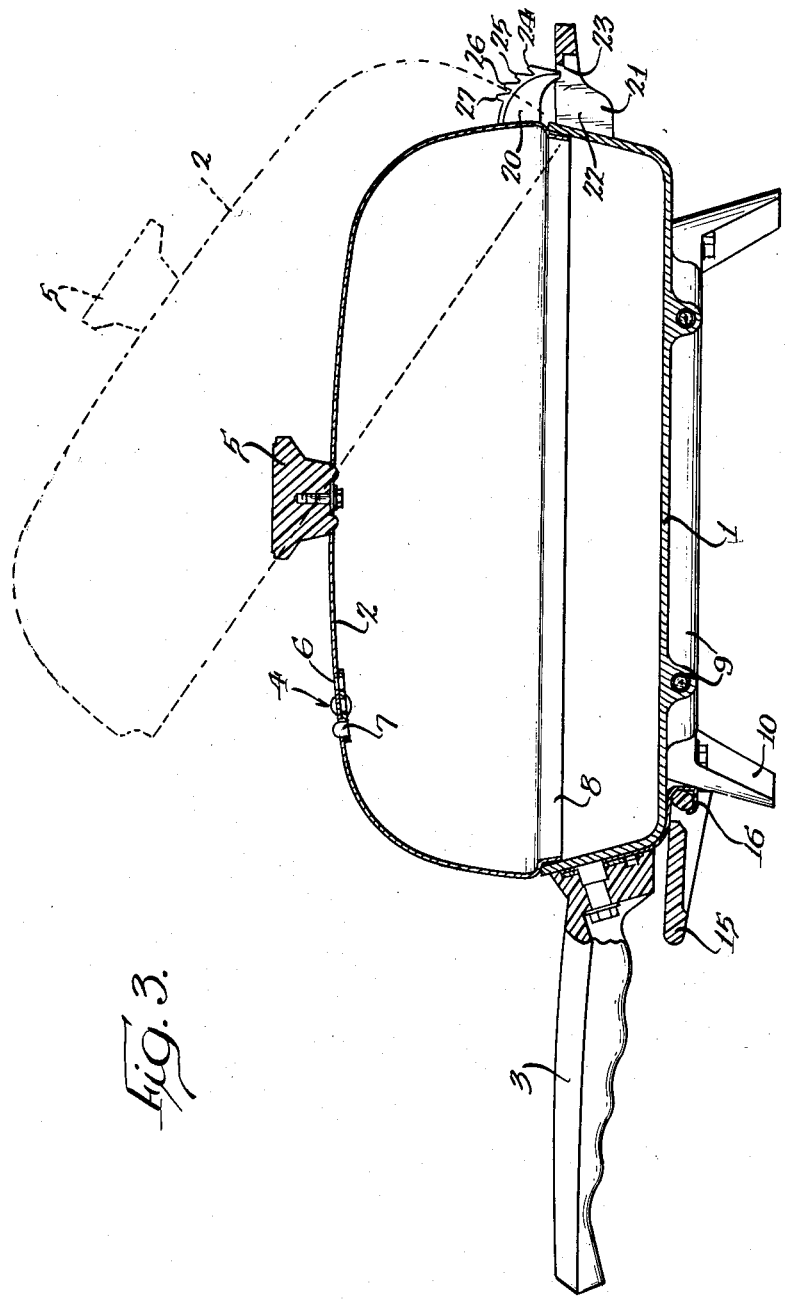
FIG. 3 is a broken away side elevation view of the frypan, with the position of the cover when partially open being illustrated in broken-line outline.
Figure 4:
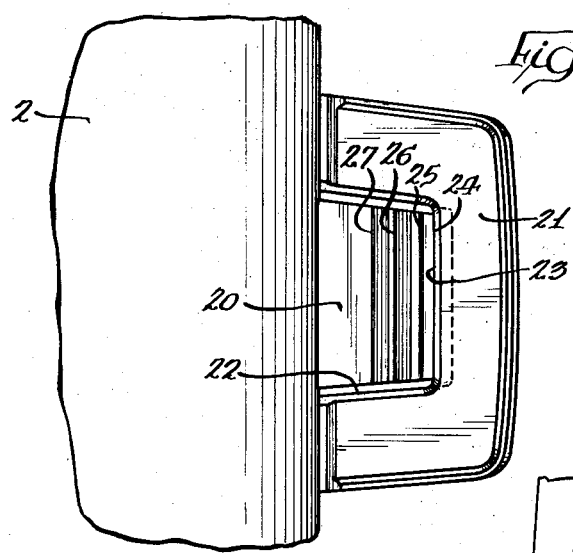
FIG. 4 is an enlarged top view of the cover tilt means of the frypan.
Figure 5:
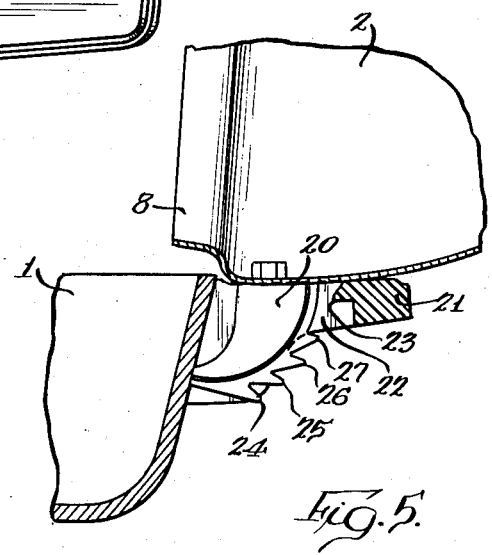
FIG. 5 is a broken away enlarged side view of the cover tilt means when the cover is in full open position.

In the closed position of cover 2, the outer end of handle 20 is partially disposed in or aligned with the opening 22 as clearly illustrated in FIGS. 1 and 3. Therefore, in order to successively engage the stepped or shouldered portions 24 to 27 with the stepped or shouldered portion 23, the cover 2 does not have to be first vertically lifted and then tilted so as to insert the handle 20 into the handle 21. Rather, a tilted disposition for the cover 2 is simply obtained by essentially rocking movement of the shouldered flange 8 about the upper edge of the vessel 1 for successive engagement of step or shoulder 23 with the steps or shoulders 24 to 27. The member 20 is curved or projects outwardly and then downwardly toward opening 22 so that the portions 24 to 27 can be successively moved past portion 23 without flange 8 losing contact with the rim edge of the vessel. Accordingly, the rim of the cover 2 is always disposed within the marginal outline of the opening of the vessel 1 so that liquids, grease, vapors and the like collected on the inside of cover 2 will always run back into the frypan. In the full open position of the cover 2 with respect to the vessel 1 the cover will be disposed approximately perpendicular with respect to the vessel. In this supported location of the cover 2 on handle 21, the outer end of member 20 will bottom against the side of vessel 1 and the part of cover 2 just above the member 20 will bottom against the upper surface of the bridge portion of handle 21. In this location of the cover, the lower rim portion thereof will still be disposed within the marginal outline of the open vessel as shown in FIG. 5. However, even if it is not, no accumulations collected on the inside of cover 2 will spill over on the support surface for the frypan but instead merely collect inside the cover 2 along the lower edge thereof due to the contour of the cover 2 and the stepped flange 8. Since there is no fixed connection between the vessel and cover or between the auxiliary handles 20 and 21, the cover 2 can be quickly returned to its closed position or entirely removed from the frypan from its tilted position by mere reverse movement or lifting away of the cover.

It will now be seen that the invention provides auxiliary handle means for the cover and receptacle of cooking vessels which are utilized as means for tiltably supporting the cover in a plurality of different set positions with respect to the vessel. Additionally, these advantages are provided in conventional cooking vessels with a minimum number of parts at low cost without necessitating any changes or modifications in the basic structure of conventional cooking vessels. The parts of the frypan which provide the inventive features of the instant application also can be readily installed in conventional cooking vessels and are easy and quick to operate with no inconvenience to the frypan user or likelihood of jamming or the like of the cover tilting means.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What is claimed as new and desired to be secured by Letters Patent of the United States is:

1. In a cooking vessel, a container, a top opening in said container, a cover for said opening, a first insulating material handle connected to the side of said container, a second insulating material handle connected to said cover adjacent the rim portion thereof, and means for supporting said cover in a plurality of different tilted positions with respect to said container with the rim portion adjacent said second handle being disposed within the marginal outline of said opening, said means comprising an opening formed in one of said handles and the other handle being receivable in said opening to support said cover in said tilted positions from said first handle.

2. In a cooking vessel as in claim 1, wherein one of said handles has a plurality of spaced stepped portions formed thereon and the other handle has another stepped portion formed thereon for selective engagement with said spaced stepped portions for supporting said cover in said plurality of different tilted positions.

3. In a cooking vessel as in claim 2, wherein said first handle is U-shaped, said second handle comprising an elongated member, said spaced stepped portions being formed along the length of said elongated member and transverse thereto, a main insulating material handle on said cover for movement of said elongated member handle into said U-shaped handle for tilted support of said cover from said U-shaped handle, and said another stepped portion formed on the bridge portion of said U-shaped handle for selective engagement with the stepped portions on said second handle.

4. In a cooking vessel as in claim 3, wherein said container has an elongated main insulating material handle connected thereto diametrically opposite to said U-shaped handle, said main container handle projecting laterally away from said container, an electrical heating element connected to the underside of said container, control means adjacent said main container handle for controlling said heating element, insulated support means connected to said underside for supporting said container on a support surface in horizontal spaced relationship, and collapsible auxiliary support means connected to said cooking vessel diametrically opposite to said U-shaped handle for supporting said container on said support surface in spaced tilted relationship.

5. In a cooking vessel, a metallic container, a top opening in said container, a cover for closing said opening, a first insulating material handle connected to the side of said container, a second insulating material handle connected to said cover adjacent the rim portion thereof, and means for supporting said cover in tilted position with respect to said container with the rim portion adjacent said second handle being disposed within the marginal outline of said opening, said means comprising a handle opening formed in one of said handles and the other handle being partially disposed in said handle opening when said cover is in fully closed position with respect to said top opening, and said other handle being further receivable in said handle opening to support said cover in said tilted position from said first handle solely by tilted movement of said cover towards said first handle, and a third insulating material handle connected to said cover for moving said cover to said tilted position.

6. In a cooking vessel, a metallic container, a top opening in said container, a cover for closing said opening, a first insulating material handle connected to the side of said container, a second insulating material handle connected to said cover adjacent the rim portion thereof, and means for supporting said cover in tilted position with respect to said container with the rim portion adjacent said second handle being disposed within the marginal outline of said opening, said means comprising an opening formed in one of said handles and the other handle being partially disposed in and further receivable in said opening to support said cover in said tilted position from said first handle solely by tilted movement of said cover towards said first handle, a third insulating material handle connected to said cover for moving said cover to said tilted position, and one of said first and second handles having a series of spaced stepped portions formed thereon for supporting said cover in a plurality of different tilted positions from said first handle, said rim portion having a stepped flange formed thereon, and said stepped flange engaging the periphery of said container top opening in said tilted cover positions.

7. In a cooking vessel as in claim 5, wherein said first handle is U-shaped, said second handle comprising an elongated member, said elongated member handle being partially disposed in and further movable into said U- shaped handle upon tilted movement of said cover toward said U-shaped handle by said third handle, and said elongated member handle being unconnected to said U-shaped handle for quick movement of said cover entirely away from container.

8. In a cooking utensil comprising an open frypan vessel and a cover for closing said vessel, means for supporting said cover on said vessel in tilted open position, said tilt support means comprising a U-shaped insulating material handle secured to a side of said vessel and projecting laterally therefrom, an insulating material member secured to said cover adjacent the rim thereof, said cover secured member projecting therefrom toward said U-shaped member in aligned disposition with the opening therein, means for tilting said cover open about its rim to move said cover secured member into said opening, and a plurality of edges formed on the upper surface of said cover secured member engageable with an edge formed on the bridge portion of said U-shaped member to selectively hold said cover tilted open in a plurality of different tilted positions.

9. In a cooking utensil as in claim 8, wherein said cover rim has an internal flange formed thereon which is seated on the edge opening of said frypan, and said cover being moved to retained tilted position by said engageable edges by solely rocking movement of said internal flange about the edge opening of said frypan adjacent said U-shaped member.

10. In a frypan, an insulating material handle connected to a side of said frypan and projecting laterally therefrom, a second insulating material handle connected to the diametrically opposite side of said frypan, a cover for said frypan, an insulating material handle connected to said cover, and means for supporting said cover on said frypan in tilted relationship with the lower rim portion thereof disposed within the upper marginal outline of the frypan, said means comprising a second insulating material handle connected to said cover adjacent the rim portion thereof, an opening formed in one of said second handles, the other second handle being receivable in said opening for supporting said cover in said tilted position from the second handle connected to said frypan, and said second frypan handle being U-shaped, said second cover handle comprising an elongated member having a plurality of stepped portions formed thereon and being insertable in said U-shaped handle for support of said cover with respect to said frypan in a plurality of different tilted positions, and said U-shaped handle having means formed thereon for selectively engaging said stepped portions.

11. In a frypan, said frypan having a bottom and an upstanding rim, an insulating material main handle connected to said rim and projecting laterally therefrom, a U-shaped insulating material auxiliary handle connected to said rim diametrically opposite to said main handle, a cover for closing said frypan, an insulating material main handle on said cover, and means for tiltably supporting said cover on said frypan with the lower portion thereof disposed within the outline of said frypan rim, said means comprising an insulating material projection connected to said cover adjacent the periphery thereof which is useful as an auxiliary cover handle, said projection being alignable and movable into said U-shaped handle for tilted support of said cover with respect to said frypan by interengagement between said auxiliary handles, said projection being freely removable from within said U-shaped handle for quick removal of said cover from said frypan, and said auxiliary handles having means formed thereon for supporting said cover on said U-shaped handle in either a plurality of tilted positions or right angle relationship with respect to said frypan.

12. In a frypan as in claim 11, wherein the means for supporting said cover in said plurality of tilted positions comprises a series of stepped portions integrally formed on said auxiliary cover handle which are engageable with a stepped edge formed on said U-shaped handle.

References Cited in the file of this patent

UNITED STATES PATENTS

| 1,334,908 | Kinzel | Mar. 23, 1920 |
| 2,886,206 | Kueser | May 12, 1959 |

FOREIGN PATENTS

| 1,045,617 | Germany | Feb. 7, 1956 |